United States Patent
Hirukawa et al.

(10) Patent No.: US 10,208,805 B2
(45) Date of Patent: Feb. 19, 2019

(54) FIXED TYPE CONSTANT VELOCITY UNIVERSAL JOINT

(71) Applicants: Hiroyasu Hirukawa, Shizuoka (JP); Teruaki Fujio, Shizuoka (JP)

(72) Inventors: Hiroyasu Hirukawa, Shizuoka (JP); Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 208 days.

(21) Appl. No.: 15/032,728

(22) PCT Filed: Oct. 14, 2014

(86) PCT No.: PCT/JP2014/077321
§ 371 (c)(1),
(2) Date: Apr. 28, 2016

(87) PCT Pub. No.: WO2015/068536
PCT Pub. Date: May 14, 2015

(65) Prior Publication Data
US 2016/0252137 A1   Sep. 1, 2016

(30) Foreign Application Priority Data
Nov. 5, 2013   (JP) .................. 2013-229390

(51) Int. Cl.
*F16D 3/223*   (2011.01)
*F16D 3/224*   (2011.01)

(52) U.S. Cl.
CPC ............. *F16D 3/224* (2013.01); *F16D 3/223* (2013.01); *F16D 2003/22303* (2013.01); *F16D 2003/22309* (2013.01); *Y10S 464/906* (2013.01)

(58) Field of Classification Search
CPC .......... F16D 3/22; F16D 3/223; F16D 3/2233; F16D 3/2237; F16D 3/224; F16D 3/24; F16D 2003/22306; F16D 2003/22309
(Continued)

(56) References Cited

U.S. PATENT DOCUMENTS 6,468,164 B2 * 10/2002 Song ............... F16D 3/2237
    464/906
2010/0099504 A1 * 4/2010 Kobayashi ......... F16D 3/2237
    464/15
(Continued)

FOREIGN PATENT DOCUMENTS

DE   195 07 859   9/1996
JP   2009250365 A * 10/2009 ........... F16D 3/224
(Continued)

OTHER PUBLICATIONS

Translation of JP 2009-250365. Fujio, et al. Constant Velocity Universal Joint. Oct. 29, 2009.*
(Continued)

*Primary Examiner* — Josh Skroupa
(74) *Attorney, Agent, or Firm* — Wenderoth, Lind & Ponack, L.L.P.

(57) ABSTRACT

Six track grooves formed in a spherical inner peripheral surface of an outer joint member are each formed into an arc shape having a curvature center at a joint center. The track grooves are inclined in a circumferential direction of the outer joint member with respect to a joint axial line, and are adjacent to each other in the circumferential direction with their inclination directions opposite to each other. Six track grooves formed in a spherical outer peripheral surface of an inner joint member are formed so as to be mirror-image symmetrical with the track grooves paired therewith of the outer joint member with respect to a joint center plane at an operating angle of 0°. An inclination angle of each of the
(Continued)

track grooves of the outer joint member with respect to the joint axial line is set to 8° or more and 16° or less.

4 Claims, 18 Drawing Sheets

(58) Field of Classification Search
USPC .......................................... 464/145, 146, 906
See application file for complete search history.

(56) References Cited

U.S. PATENT DOCUMENTS

| 2011/0070955 A1* | 3/2011 | Oh ........................... F16D 3/24 |
| | | 464/146 |
| 2012/0165105 A1* | 6/2012 | Fujio ....................... F16D 3/224 |
| | | 464/145 |

FOREIGN PATENT DOCUMENTS

| JP | 2010-43667 | 2/2010 |
| JP | 2012-193860 | 10/2012 |
| JP | 2013-133919 | 7/2013 |

OTHER PUBLICATIONS

International Search Report dated Dec. 16, 2014 in International (PCT) Application No. PCT/JP2014/077321.
International Preliminary Report on Patentability and Written Opinion of the International Searching Authority dated May 10, 2016 in International (PCT) Application No. PCT/JP2014/077321.

* cited by examiner

| INCLINATION ANGLE \ OPERATING ANGLE | 2° | 4° | 6° | 8° | 10° | 12° | 14° | 16° | 18° | 20° |
|---|---|---|---|---|---|---|---|---|---|---|
| 4° | ○ | ○ | ○ | △ | × | × | × | × | × | × |
| 6° | ○ | ○ | ○ | ○ | ○ | △ | × | × | × | × |
| 8° | ○ | ○ | ○ | ○ | ○ | ○ | ○ | △ | × | × |
| 10° | ○ | ○ | ○ | ○ | ○ | ○ | ○ | ○ | ○ | △ |
| 12° | ○ | ○ | ○ | ○ | ○ | ○ | ○ | ○ | ○ | ○ |
| 14° | ○ | ○ | ○ | ○ | ○ | ○ | ○ | ○ | ○ | ○ |
| 16° | ○ | ○ | ○ | ○ | ○ | ○ | ○ | ○ | ○ | ○ |

○ : FORCE OF ROTATING CAGE IS NOT APPLIED AT ALL TO CAGE
△ : FORCE OF ROTATING CAGE IS APPLIED TO CAGE DEPENDING ON PHASE
× : FORCE OF ROTATING CAGE IS APPLIED TO CAGE AT ANY PHASE ANGLE

FORMATION PATTERN OF WEDGE ANGLE OF BALL TRACKS WITH
RESPECT TO $T_1$ AT PHASE ANGLE OF 90°

FORMATION PATTERN OF WEDGE ANGLE OF BALL TRACKS WITH
RESPECT TO $T_1$ AT PHASE ANGLE OF 0°

FORMATION PATTERN OF WEDGE ANGLE OF BALL TRACKS WITH
RESPECT TO $T_1$ AT PHASE ANGLE OF 30°

FORMATION PATTERN OF WEDGE ANGLE OF BALL TRACKS WITH
RESPECT TO $T_1$ AT PHASE ANGLE OF 90°

FORMATION PATTERN OF WEDGE ANGLE OF BALL TRACKS WITH
RESPECT TO $T_1$ AT PHASE ANGLE OF 0°

FORMATION PATTERN OF WEDGE ANGLE OF BALL TRACKS WITH
RESPECT TO $T_1$ AT PHASE ANGLE OF 45°

FORMATION PATTERN OF WEDGE ANGLE OF BALL TRACKS WITH
RESPECT TO $T_1$ AT PHASE ANGLE OF 90°

FIXED TYPE CONSTANT VELOCITY UNIVERSAL JOINT

TECHNICAL FIELD

The present invention relates to a fixed type constant velocity universal joint to be used, for example, in a power transmission system of automobiles, which is configured to allow only angular displacement between two shafts on a driving side and a driven side. More specifically, the present invention relates to a fixed type constant velocity universal joint for a propeller shaft, which is mounted mainly to an FR vehicle and a 4WD vehicle, and is configured to transmit rotational power from a transmission to a differential.

BACKGROUND ART

As fixed type constant velocity universal joints, there have been publicly known joints of a six-ball Rzeppa type (BJ), a six-ball undercut-free type (UJ), an eight-ball Rzeppa type (EBJ), an eight-ball undercut-free type (EUJ), and a track groove crossing type in which paired track grooves cross each other (see, for example, Patent Literature 1). Those joints are used as appropriate in accordance with purposes, required characteristics, and the like.

Referring to FIG. 14a and FIG. 14b, description is given of an example of the fixed type constant velocity universal joint of the track groove crossing type (hereinafter referred to as "crossing fixed type CVJ"). FIG. 14a is a vertical sectional view (sectional view taken along the line A-O-B in FIG. 14b) of a state in which the crossing fixed type CVJ for a propeller shaft forms an operating angle of 0°, and FIG. 14b is a front view of the crossing fixed type CVJ. The constant velocity universal joint 100 includes an outer joint member 102, an inner joint member 103, balls 104, and a cage 105. Eight arc-shaped track grooves 107 are formed in a spherical inner peripheral surface 106 of the outer joint member 102. The track grooves 107 are formed so that planes including ball raceway center lines x of the track grooves 107 are inclined with respect to a joint axial line n-n and the track grooves 107 are adjacent to each other in a circumferential direction with their inclination directions opposite to each other. Eight arc-shaped track grooves 109 are formed in a spherical outer peripheral surface 108 of the inner joint member 103. The track grooves 109 are formed so as to be mirror-image symmetrical with the paired track grooves 107 of the outer joint member 102 with respect to a plane P including a joint center O at the operating angle of 0°. That is, the inner joint member 103 is assembled to an inner periphery of the outer joint member 102 so that the paired track grooves 107 and 109 cross each other.

As illustrated in FIG. 14a, curvature centers of the track grooves 107 of the outer joint member 102 and the track grooves 109 of the inner joint member 103 are each positioned at the joint center O. The balls 104 are interposed in crossing portions between the paired track grooves 107 and 109, and are received and held in pocket portions 105a of the cage 105 arranged between the spherical inner peripheral surface 106 of the outer joint member 102 and the spherical outer peripheral surface 108 of the inner joint member 103. Curvature centers of a spherical outer peripheral surface 111 and a spherical inner peripheral surface 112 of the cage 105 are each positioned at the joint center O. In the constant velocity universal joint 100, the balls 104 are interposed in the crossing portions between the paired track grooves 107 and 109. Therefore, when the joint forms an operating angle, the balls 104 are always guided in a plane bisecting an angle formed between axial lines of the outer joint member 102 and the inner joint member 103. With this, rotational torque is transmitted at a constant velocity between the two axes.

Further, the track grooves 107 of the outer joint member 102 and the track grooves 109 of the inner joint member 103 are adjacent to each other in the circumferential direction with their inclination directions opposite to each other. Therefore, when both the joint members 102 and 103 rotate relative to each other at the operating angle of 0°, forces in the opposite directions are applied from the balls 104 to the pocket portions 105a of the cage 105 that are adjacent to each other in the circumferential direction. With this, the cage 105 is stabilized at the position of the joint center O. Thus, a contact force between the spherical outer peripheral surface 111 of the cage 105 and the spherical inner peripheral surface 106 of the outer joint member 102, and a contact force between the spherical inner peripheral surface 112 of the cage 105 and the spherical outer peripheral surface 108 of the inner joint member 103 are suppressed. As a result, it is possible to attain the constant velocity universal joint 100 that is capable of suppressing torque loss and heat generation, and is excellent in durability. Thus, with use of the constant velocity universal joint 100, it is possible to attain a propeller shaft that is suppressed in torque loss and heat generation, and is enhanced in efficiency.

Operability of fixed type constant velocity universal joints including the constant velocity universal joint 100 described above, in which rotational torque is transmitted between both the joint members through intermediation of the balls, is secured by setting wedge angles of ball tracks formed by the paired track grooves (by holding the balls with the paired track grooves). In the constant velocity universal joint 100 of the track groove crossing type, as described above, when wedge angles, which are formed so that a force of pressing the cage 105 to one axial side (for example, right side in FIG. 14a) is applied from the balls 104 at the operating angle of 0°, are defined as positive wedge angles, and wedge angles, which are formed so that a force of pressing the cage 105 to the other axial side is applied from the balls 104 at the operating angle of 0°, are defined as negative wedge angles, ball tracks that form the positive wedge angles and ball tracks that form the negative wedge angles are alternately formed in the circumferential direction. With this, desired joint performance is secured. In the constant velocity universal joint 100 described above, the curvature centers of the track grooves 107 and 109 are each positioned at the joint center O, and hence sizes and opening directions of the wedge angles are determined in accordance with angles (inclination angles) that are formed by the track grooves 107 and 109 (by planes including the ball raceway center lines thereof) with respect to the joint axial line n-n, contact angles of the balls 104 with respect to the track grooves 107 and 109, and operating angles.

CITATION LIST

Patent Literature 1: JP 2010-043667 A

SUMMARY OF INVENTION

Technical Problem

Incidentally, the wedge angles of the ball tracks constantly vary along with variation in operating angle of the joint and during relative rotation between both the joint members. Then, when the joint forms a high operating angle, during a single rotation of both the joint members, the positive wedge angles may become zero or negative, or the negative wedge angles may become zero or positive. When the positive wedge angles become negative or the negative wedge angles become positive (that is, when the opening directions of the wedge angles are reversed to each other), those wedge angles temporarily become zero. When "the wedge angles become zero," the balls are released from holding positions between the paired track grooves. Thus, when the wedge angles become zero even temporarily, the operability of the joint may be adversely affected. However, it has been considered that such a problem can be avoided as much as possible by holding the balls in the pocket portions of the cage.

However, through verification by the inventors of the present invention, it was demonstrated that, when both the joint members rotated relative to each other in a six-ball crossing fixed type CVJ at a predetermined operating angle or higher, a force of rotating the cage was applied to the cage, and behavior of the cage was sometimes instable. When the behavior of the cage is instable, the balls are difficult to be held at predetermined positions, and the operability of the joint is deteriorated. In addition, the effect of suppressing torque loss and heat generation cannot be effectively obtained.

Next, referring to FIG. 10a and FIG. 10b, description is given of a case where a rotational force is applied to the cage of the six-ball crossing fixed type CVJ. FIG. 10a is a graph for showing results of testing how wedge angles of ball tracks $T_1$ to $T_6$ (see FIG. 10b) vary during a single rotation of both the joint members of the six-ball crossing fixed type CVJ at an operating angle of 12° under a state in which the inclination angle of each of the track grooves with respect to the joint axial line is set to 6°. Further, FIG. 10b is a schematic view of a formation pattern (whether the wedge angles are positive, negative, or zero) of the wedge angles of the ball tracks $T_1$ to $T_6$ with respect to the ball track $T_1$ at a phase angle of 90°. The marks "+," "−," and "0" illustrated in FIG. 10b respectively indicate that the wedge angle is positive, negative, and zero. The same holds true also in FIG. 11b to FIG. 11d and FIG. 15b to FIG. 15d described later.

As shown and illustrated in FIG. 10a and FIG. 10b, the wedge angle of the ball track $T_4$ in rotational symmetry at 180° with respect to the ball track $T_1$ at the phase angle of 90° is also zero. Further, opening directions of the wedge angles of the ball tracks $T_2$ and $T_3$ adjacent to each other in the circumferential direction are opposite to each other, and absolute values of both the wedge angles are equal to each other. In addition, opening directions of the wedge angles of the ball tracks $T_5$ and $T_6$ adjacent to each other in the circumferential direction are opposite to each other, and absolute values of both the wedge angles are equal to each other. Thus, a rotational force R about a straight line $Z_1$ that extends in a radial direction across the joint center O, an intermediate portion between the ball tracks $T_2$ and $T_3$, and an intermediate portion between the ball tracks $T_5$ and $T_6$ is applied to the cage. Although detailed illustration and description are omitted, also with respect to the ball track $T_1$ at phase angles of 210° and 330°, the rotational force is applied to the cage in the same way.

When the six-ball crossing fixed type CVJ forms an even higher operating angle (specifically, 24°), the wedge angles of the ball tracks $T_1$ to $T_6$ vary as shown in FIG. 11a during the single rotation of both the joint members. In this case, at phase angles of, for example, 0°, 30°, and 90°, the ball tracks $T_1$ to $T_6$ form the wedge angles as illustrated respectively in FIG. 11b to FIG. 11d. With respect to the ball track $T_1$ at the phase angle of 0°, the rotational force R about a straight line $Z_2$ illustrated in FIG. 11b is applied to the cage. With respect to the ball track $T_1$ at the phase angle of 30°, the rotational force about a straight line $Z_3$ illustrated in FIG. 11c is applied to the cage. With respect to the ball track $T_1$ at the phase angle of 90°, the rotational force about a straight line $Z_4$ illustrated in FIG. 11d is applied to the cage. Moreover, when both the joint members rotate relative to each other in the crossing fixed type CVJ at the operating angle of 24°, the rotational force R is constantly applied to the cage. As a result, functions of the joint cannot be exerted.

On the other hand, even when both the joint members rotate relative to each other under a state in which the eight-ball crossing fixed type CVJ described with reference to FIG. 14 forms a relatively high operating angle, there is no risk in that the rotational force is applied to the cage. Detailed description thereof is given with reference to FIG. 15a to FIG. 15d. FIG. 15a is a graph for showing results of testing how wedge angles of eight ball tracks $t_1$ to $t_8$ vary during a single rotation of both the joint members of the eight-ball crossing fixed type CVJ at the operating angle of 12° under a state in which the inclination angle of each of the track grooves with respect to the joint axial line is set to 6°. FIG. 15b to FIG. 15d are schematic views of formation patterns of the wedge angles of the ball tracks $t_1$ to $t_8$ with respect to the ball track $t_1$ at the phase angles of 0°, 45°, and 90°, respectively. As is clear from the reason described above, in any of the cases illustrated in FIG. 15b to FIG. 15d in which the ball track $t_1$ is at the phase angles of 0°, 45°, and 90°, due to the formation patterns of the wedge angles formed by the ball tracks $t_1$ to $t_8$, the rotational force is not applied to the cage. Although illustration is omitted, even when both the joint members rotate relative to each other in the eight-ball crossing fixed type CVJ at the operating angle of 24°, the rotational force is not applied to the cage.

The test results as described above demonstrated that the problem of the instabilization of the behavior of the cage in the crossing fixed type CVJ became conspicuous particularly when both the joint members rotate relative to each other under a state in which the number of the balls was set to six and an operating angle of more than 10° was formed. Thus, the six-ball crossing fixed type CVJ is difficult to be employed as a fixed type constant velocity universal joint for a drive shaft, which forms a maximum operating angle of approximately from 40° to 50°, and frequently forms operating angles of approximately 20° during use. On the other hand, a fixed type constant velocity universal joint for a propeller shaft is used mostly at operating angles of 10° or less, and operating angles of more than 14° are scarcely formed even in consideration of behavior of a vehicle. In view of such circumstances, the inventors of the present invention conceived that there was still room for employment of the six-ball crossing fixed type CVJ as the fixed type constant velocity universal joint for a propeller shaft. In addition, the six-ball fixed type constant velocity universal joint has advantages as follows over the eight-ball fixed type constant velocity universal joint. (1) Cost reduction can be achieved in accordance with reduction in total number of components. (2) Components are excellent in processability and assemblability, and hence variation in quality (performance) among the fixed type constant velocity universal joints can be suppressed. (3) A load capacity can be increased in accordance with increase in ball size. For this reason, when the six-ball crossing fixed type CVJ can be attained, it is possible to effectively provide the advantages as described above, and to attain a propeller shaft that is suppressed in torque loss and heat generation, and is enhanced in efficiency.

In view of the circumstances described above, the present invention has an object to provide a six-ball fixed type constant velocity universal joint of a track groove crossing type, which is suppressed in torque loss and heat generation, is enhanced in efficiency, and is capable of stably exerting desired joint performance within a range of a normal operating angle of propeller shafts.

Solution to Problem

As described above, in the fixed type constant velocity universal joint of the track groove crossing type, the wedge angles vary in accordance not only with the operating angle of the joint, but also with the inclination angles of the track grooves with respect to the joint axial line, and the contact angles of the balls with respect to the track grooves. In addition, in the six-ball crossing fixed type CVJ (strictly, in six-ball crossing fixed type CVJ in which the ball tracks that form the positive wedge angles and the ball tracks that form the negative wedge angles at the operating angle of 0° are alternately arranged in the circumferential direction), the rotational force is not applied to the cage as long as the wedge angles of the ball tracks do not become zero during a single rotation of both the joint members. Thus, it is possible to avoid problems such as the instabilization of the behavior of the cage.

In view of the circumstances, the inventors of the present invention tested how the wedge angles varied during a single rotation of both the joint members when the contact angles were changed without changing the inclination angles and when the inclination angles were changed without changing the contact angles. As a result, it was found that a phase in which the wedge angles became zero was not changed even when the contact angles were changed without changing the inclination angles. This is understood from FIG. 12 for showing that, for example, a wedge angle of a ball track $T\alpha$ formed by track grooves at a contact angle $\alpha$, a wedge angle of a ball track $T\alpha'$ formed by track grooves at a contact angle $\alpha'$ higher than $\alpha$, and a wedge angle of a ball track $T\alpha''$ formed by track grooves at a contact angle $\alpha''$ higher than $\alpha'$ are each zero in the same phase. In short, even when the contact angles are changed without changing the inclination angles, the wedge angles of the ball tracks cannot be avoided from becoming zero at high operating angles.

On the other hand, it was found that, when the inclination angles were changed without changing the contact angles, values of the wedge angles in each phase varied in accordance with values of the inclination angles. This is understood from FIG. 13 for showing that, for example, a wedge angle of a ball track $T\beta$ formed by track grooves that form an inclination angle $\beta'$ (note that, $\beta'>\beta$) is higher in each phase than a wedge angle of a ball track $T\beta$ formed by track grooves that form an inclination angle $\beta$ with respect to the joint axial line, and a wedge angle of a ball track $T\beta''$ formed by track grooves that form an inclination angle $\beta''$ (note that, $\beta''>\beta'$) is higher in each phase than the wedge angle of the ball track $T\beta'$. From those test results, the inventors of the present invention found that, when a range of the inclination angles of the track grooves with respect to the joint axial line was appropriately set, it was possible to attain a six-ball crossing fixed type CVJ that was suppressed in torque loss and enhanced in efficiency, and was capable of stably exerting desired joint performance within a range of a normal operating angle of propeller shafts (operating angles of 14° or less). Based on this finding, the inventors of the present invention have completed the present invention.

That is, according to one embodiment of the present invention, which is devised to achieve the above-mentioned object, there is provided a fixed type constant velocity universal joint, comprising: an outer joint member having a spherical inner peripheral surface in which six track grooves are formed so as to extend in an axial direction of the outer joint member; an inner joint member having a spherical outer peripheral surface in which six track grooves are formed so as to be paired with the six track grooves of the outer joint member; balls configured to transmit torque, the balls being interposed between the six track grooves of the outer joint member and the six track grooves of the inner joint member, which are paired with each other; and a cage comprising pocket portions configured to hold the balls, the cage having: a spherical outer peripheral surface fitted to the spherical inner peripheral surface of the outer joint member; and a spherical inner peripheral surface fitted to the spherical outer peripheral surface of the inner joint member, wherein the six track grooves of the outer joint member are each formed into an arc shape having a curvature center that is prevented from being offset in the axial direction with respect to a joint center, wherein the six track grooves of the outer joint member are inclined in a circumferential direction of the outer joint member with respect to a joint axial line and are adjacent to each other in the circumferential direction with their inclination directions opposite to each other, wherein the six track grooves of the inner joint member are formed so as to be mirror-image symmetrical with the six track grooves paired therewith of the outer joint member with respect to a joint center plane at an operating angle of 0°, wherein the fixed type constant velocity universal joint is assembled for use in a propeller shaft, and wherein an inclination angle $\gamma$ of each of the six track grooves of the outer joint member with respect to the joint axial line is set to 8° or more and 16° or less.

The "joint axial line" herein refers to a longitudinal axial line that is a joint rotation center, and corresponds to a joint axial line N-N in the embodiments described later. Further, the "joint center plane at the operating angle of 0°" refers to a plane including the joint center at the operating angle of 0° and extending in a direction orthogonal to the joint axial line.

As described above, when the inclination angle $\gamma$ of each of the track grooves of the outer joint member with respect to the joint axial line is set to 8° or more and 16° or less in the six-ball fixed type constant velocity universal joint of the track groove crossing type, as understood from the test results shown in FIG. 6a, as long as an operating angle to be formed by the constant velocity universal joint falls within the range of the normal operating angle of propeller shafts (operating angles of 14° or less), it is possible to prevent wedge angles of ball tracks formed by the paired track grooves from becoming zero during a single rotation of both the joint members. With this, it is possible to effectively prevent application of the rotational force to the cage, that is, instabilization of behavior of the cage during use. As a result, it is possible to avoid problems such as increase in torque loss and heat generation that may be caused by the instabilization of the behavior of the cage.

It is preferred that a relational expression of $L=2\times(R+d/2)\times\sin(\theta/2)$ be satisfied, where L is an effective length of each of the six track grooves of the outer joint member, R is a pitch circle radius (PCR) of the balls, d is a diameter of each of the balls, and $\theta$ is an operating angle of the fixed type constant velocity universal joint when the propeller shaft is assembled into an automobile. With this, at the time when the propeller shaft is assembled into an automobile, the balls can be reliably prevented from dropping off the track grooves.

The curvature centers of the track grooves may be arranged on the joint axial line, or may be arranged at positions offset in a radial direction with respect to the joint axial line. By employing the former configuration, depths of the track grooves can be set equal to each other, and processes thereon can be simplified. Further, by employing the latter configuration, the depths of the track grooves can be adjusted in accordance with the offset amount, and hence an optimum track groove depth can be secured.

The balls may be held in contact with the six track grooves of the outer joint member and the six track grooves of the inner joint member at a contact angle of from 30° to 45°. With this, the track grooves and the balls can be stably held in contact with each other.

Advantageous Effects of Invention

As described above, according to the present invention, it is possible to provide the six-ball fixed type constant velocity universal joint of the track groove crossing type, which is suppressed in torque loss and heat generation, is enhanced in efficiency, and is capable of stably exerting desired joint performance within a range of the normal operating angle of the propeller shafts.

BRIEF DESCRIPTION OF DRAWINGS

FIG. 6a is a table for showing results of research on how formation patterns of wedge angles in the fixed type constant velocity universal joint illustrated in FIG. 1 are influenced by sizes of an operating angle and an inclination angle.

FIG. 6b is a schematic graph for showing an example of "o" shown in FIG. 6a.

FIG. 11a is an explanatory graph for showing technical findings in the process to arrive at the present invention, specifically, for showing variation patterns of the wedge angles of the ball tracks along with the relative rotation between both the joint members under a state in which the six-ball fixed type constant velocity universal joint of the track groove crossing type forms an operating angle higher than that in FIG. 10a.

DESCRIPTION OF EMBODIMENTS

Now, embodiments of the present invention are described with reference to the drawings.

Figure 1A:
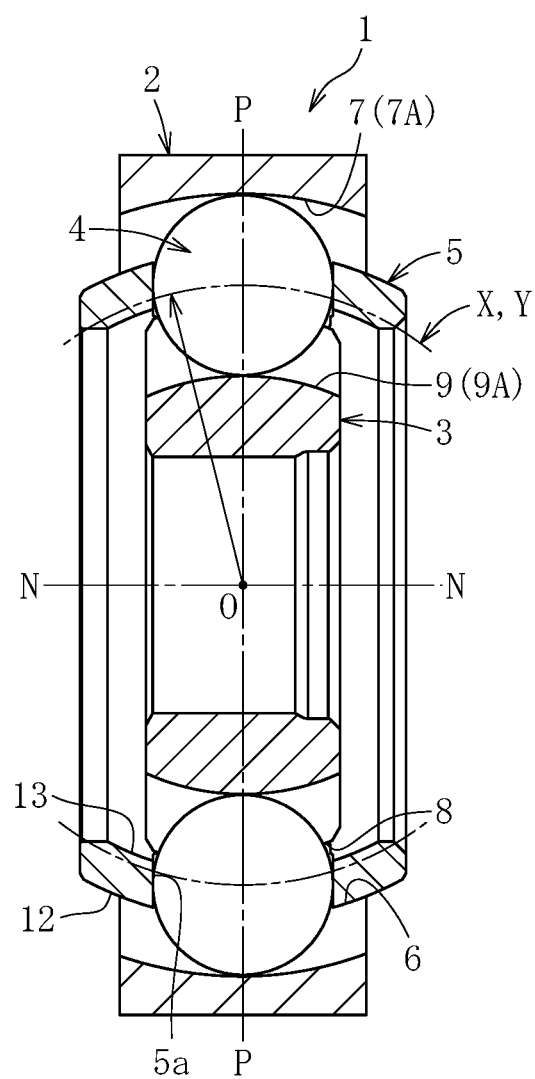
FIG. 1a is a partial vertical sectional view of a fixed type constant velocity universal joint according to a first embodiment of the present invention.
Figure 1B:
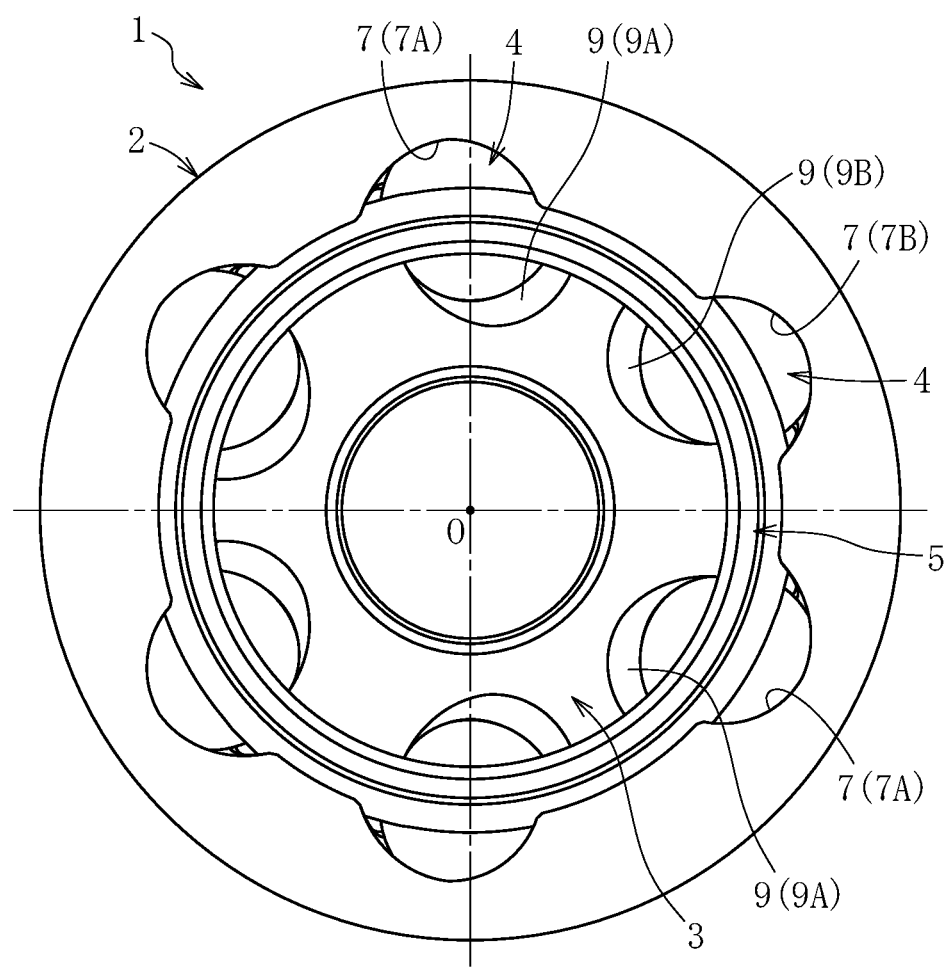
FIG. 1b is a front view of the fixed type constant velocity universal joint.

FIG. 1a is a partial vertical sectional view of a fixed type constant velocity universal joint 1 according to a first embodiment of the present invention, and FIG. 1b is a front view of the constant velocity universal joint 1. The constant velocity universal joint 1 is assembled for use in a propeller shaft, which is mounted mainly to an FR vehicle and a 4WD vehicle, and is configured to transmit rotational power from a transmission to a differential. The constant velocity universal joint 1 comprises a ring-shaped outer joint member 2, an inner joint member 3, six balls 4 arranged between both the joint members 2 and 3, and a cage 5 configured to hold the balls 4. Detailed description of the propeller shaft having the constant velocity universal joint 1 assembled thereto is given later.

Figure 2A:
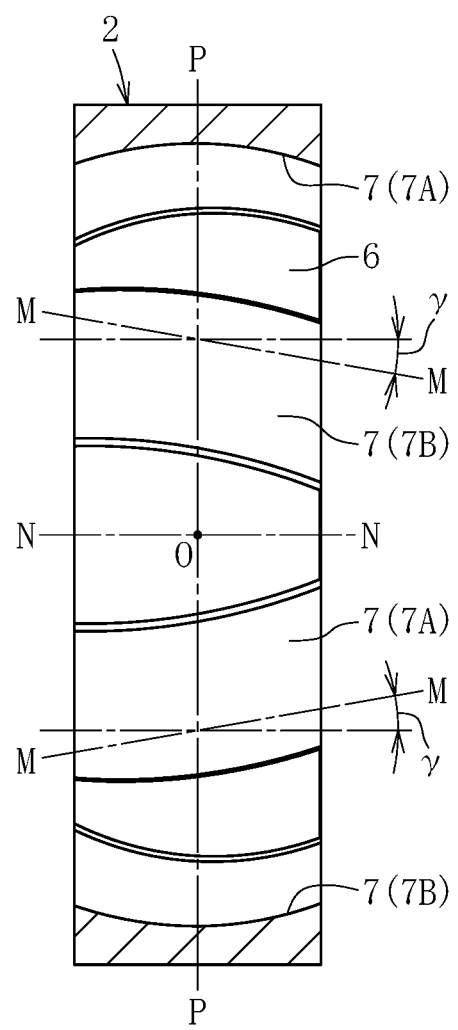
FIG. 2a is a partial vertical sectional view of an outer joint member.
Figure 2B:
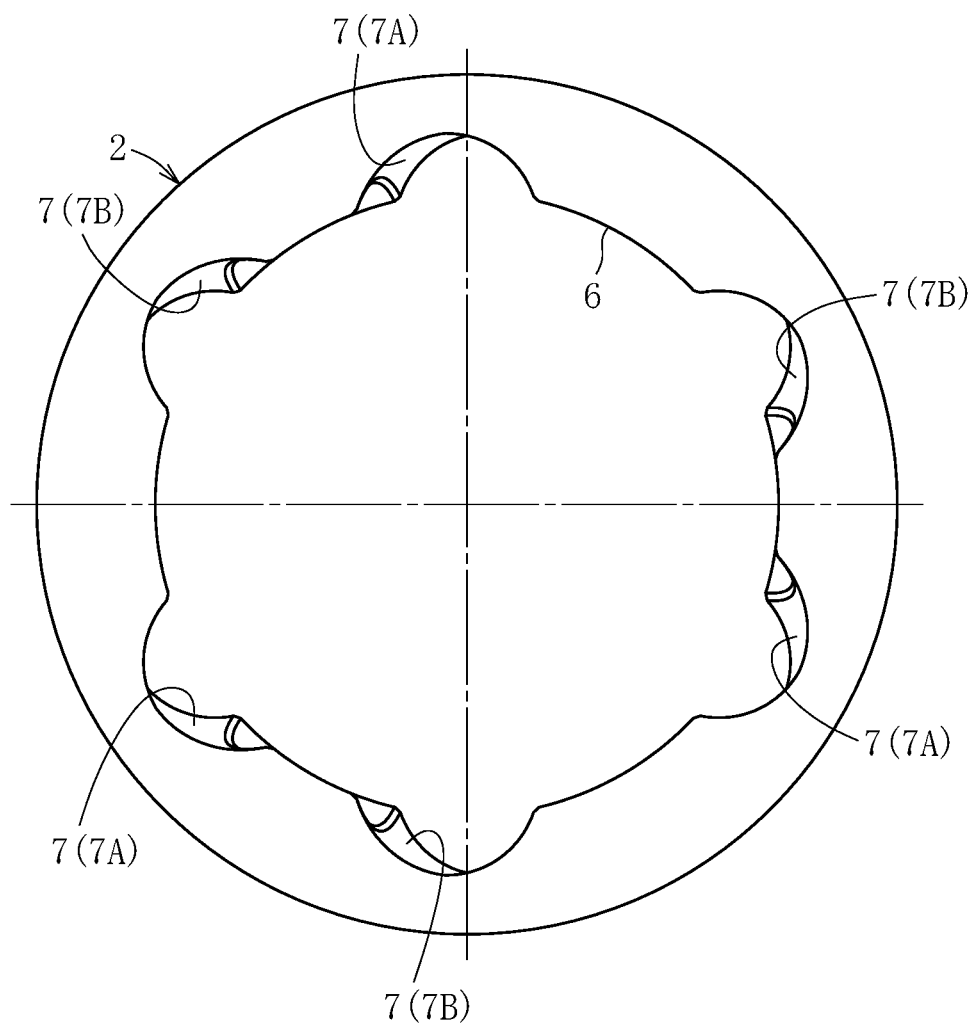
FIG. 2b is a front view of the outer joint member.
Figure 3A:
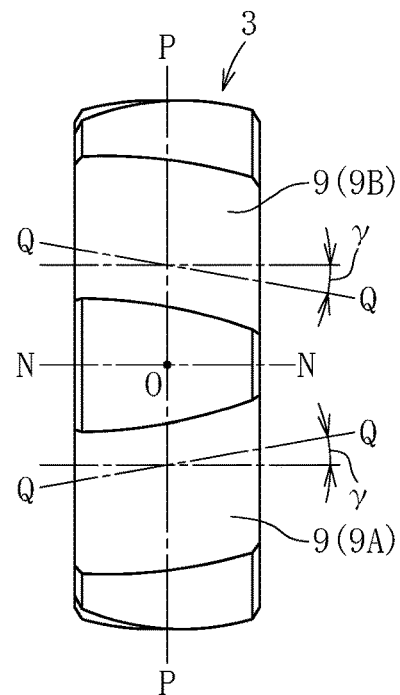
FIG. 3a is a side view of an inner joint member.

As illustrated in FIG. 2a and FIG. 2b, six track grooves 7 are formed in a spherical inner peripheral surface 6 of the ring-shaped outer joint member 2 so as to extend along an axial direction. The track grooves 7 comprise track grooves 7A and 7B that are inclined at an angle γ in a circumferential direction with respect to a joint axial line N-N and adjacent to each other in the circumferential direction with their inclination directions opposite to each other. As illustrated also in FIG. 3a and FIG. 3b, six track grooves 9 are formed in a spherical outer peripheral surface 8 of the inner joint member 3 so as to extend along the axial direction. The track grooves 9 comprise track grooves 9A and 9B that are inclined at the angle γ in the circumferential direction with respect to the joint axial line N-N and adjacent to each other in the circumferential direction with their inclination directions opposite to each other. The inner joint member 3 is assembled to an inner periphery of the outer joint member 2 so that the track grooves 9 cross the paired track grooves 7 of the outer joint member 2. In addition, each ball 4 is arranged in a crossing portion between the paired track grooves 7 and 9 of the outer joint member 2 and the inner joint member 3. The track grooves 7 and 9 are illustrated in FIG. 1a under a state in which cross sections taken along a plane M illustrated in FIG. 2a and a plane Q illustrated in FIG. 3a are rotated to an inclination angle of γ=0°.

Although detailed illustration is omitted, an effective length L of each of the track grooves 7 (7A and 7B) of the outer joint member 2 is set to satisfy a relational expression of $L=2\times(R+d/2)\times\sin(\theta/2)$, where R is a pitch circle radius (PCR) of the balls 4, d is a diameter of each of the balls 4, and θ is an operating angle of the fixed type constant velocity universal joint 1 when the propeller shaft is assembled into an automobile. With this, at the time when the propeller shaft is assembled into an automobile, the ball 4 can be reliably prevented from dropping off the track grooves 7 (7A and 7B).

The term "ball raceway center line" is hereinafter used to accurately describe forms (such as inclined state and curved state) of the track grooves. The ball raceway center line refers to a trajectory of the center of the ball when the ball moves along the track groove. Thus, the form of the track grooves corresponds to a form of the ball raceway center lines.

As illustrated in FIG. 1a, a ball raceway center line X of each track groove 7 of the outer joint member 2 and a ball raceway center line Y of each track groove 9 of the inner joint member 3 are each formed into an arc shape having a curvature center at a joint center O. In this way, the curvature centers of the ball raceway center line X of each track groove 7 of the outer joint member 2 and the ball raceway center line Y of each track groove 9 of the inner joint member 3 are each arranged on the joint center O, that is, on the joint axial line N-N. With this, depths of the track grooves 7 and 9 can be set equal to each other, and processes therefor can be simplified.

Figure 16:
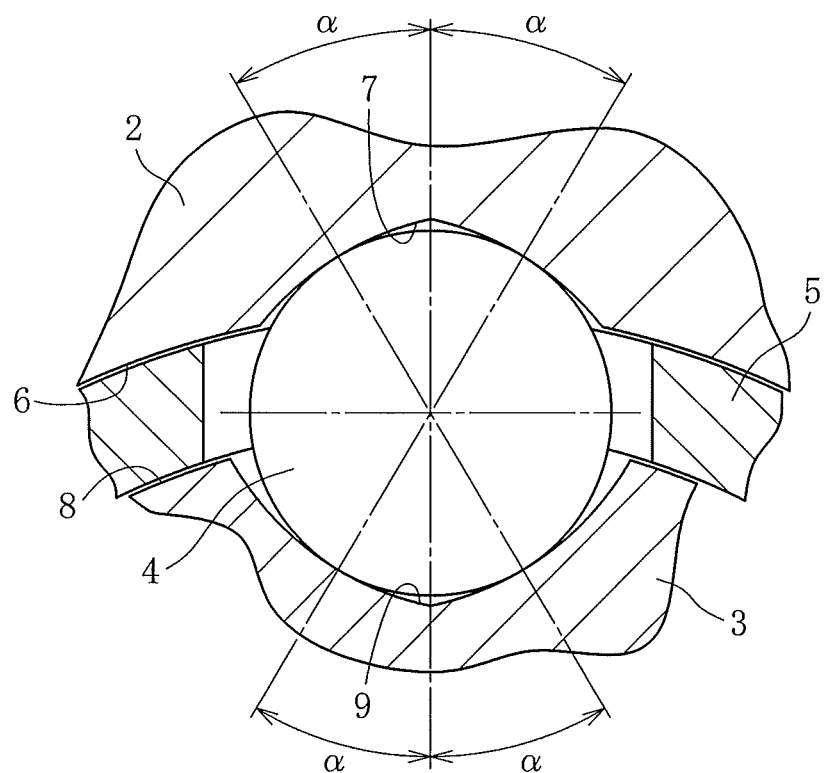
FIG. 16 is a schematic view of track grooves formed into a Gothic arch shape in horizontal cross section.

The track grooves 7 and 9 are formed into an elliptical shape or a Gothic arch shape in horizontal cross section (cross section orthogonal to the axis), and the track grooves 7 and 9 are held in so-called angular contact with each ball 4 at a contact angle of approximately from 30° to 45° (see FIG. 16 in which the track grooves 7 and 9 are formed into the Gothic arch shape). Thus, the ball 4 is held in contact with side surface portions of the track grooves 7 and 9, which are slightly spaced apart from groove bottoms of the track grooves 7 and 9.

Now, supplementary description is given of the reference symbols of the track grooves. Reference symbol 7 represents the track grooves of the outer joint member 2 as a whole. When the track grooves having different inclination directions are to be distinguished from each other, reference symbol 7A represents a track groove inclined on one side in the circumferential direction with respect to the joint axial line N-N, and reference symbol 7B represents a track groove inclined on the other side in the circumferential direction with respect to the joint axial line N-N. The track grooves 9 of the inner joint member 3 are represented by the reference symbols in a similar manner.

Referring to FIG. 2a and FIG. 2b, description is given of a state in which the track grooves 7 of the outer joint member 2 are inclined in the circumferential direction with respect to the joint axial line N-N. As illustrated in FIG. 2a, a plane M including the ball raceway center line X of each track groove 7A and the joint center O is inclined at an angle γ on one side in the circumferential direction with respect to the joint axial line N-N. Further, a plane M including the ball raceway center line X of each track groove 7B adjacent to the track groove 7A in the circumferential direction and the joint center O is inclined at an angle γ on the other side in the circumferential direction with respect to the joint axial line N-N.

Figure 3B:
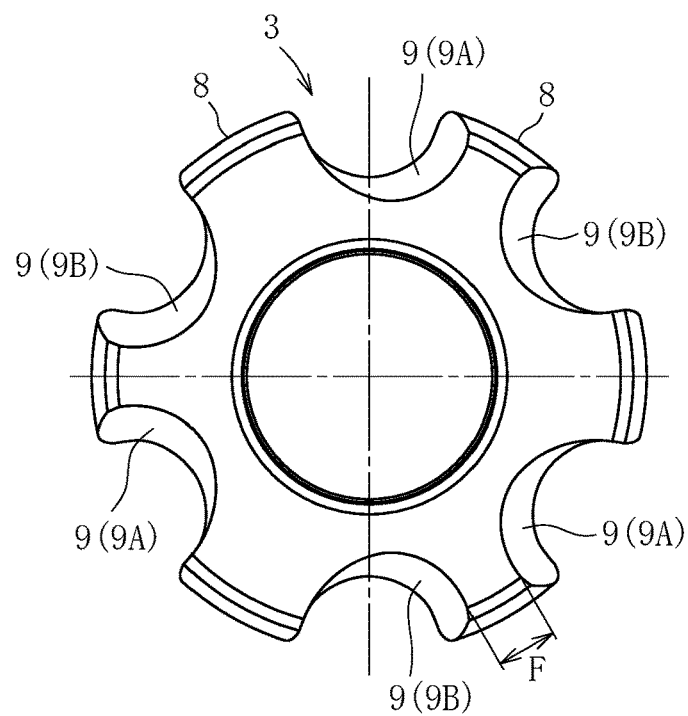
FIG. 3b is a front view of the inner joint member.

Referring to FIG. 3a and FIG. 3b, description is given of a state in which the track grooves 9 of the inner joint member 3 are inclined in the circumferential direction with respect to the joint axial line N-N. As illustrated in FIG. 3a, a plane Q including the ball raceway center line Y of each track groove 9A and the joint center O is inclined at an angle γ on one side in the circumferential direction with respect to the joint axial line N-N. Further, a plane Q including the ball raceway center line Y of each track groove 9B adjacent to the track groove 9A in the circumferential direction and the joint center O is inclined at an angle γ on the other side in the circumferential direction with respect to the joint axial line N-N (opposite direction to the inclination direction of the track groove 9A). The track grooves 9 (9A and 9B) of the inner joint member 3 are formed so as to be mirror-image symmetrical with the paired track grooves 7 (7A and 7B) of the outer joint member 2 with respect to a joint center plane P at an operating angle of 0°.

Figure 4:
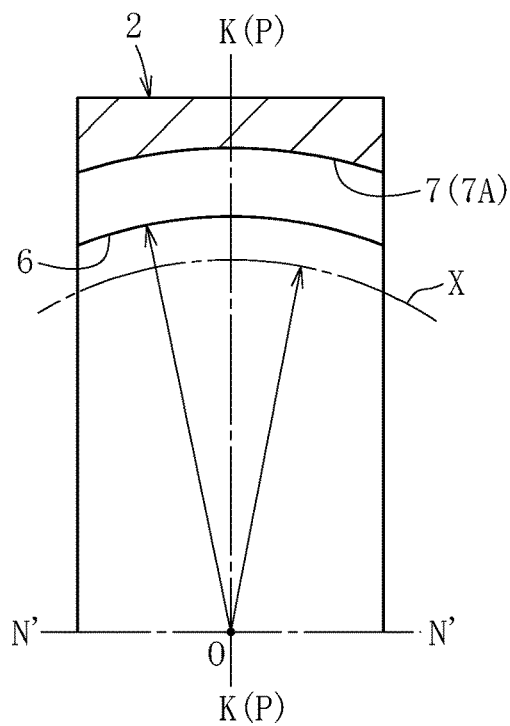
FIG. 4 is a partial vertical sectional view of details of a track groove of the outer joint member.

Next, referring to FIG. 4, detailed description is given of the track grooves of the outer joint member 2 when viewed in a vertical cross section. FIG. 4 is a sectional view taken along the plane M including the ball raceway center line X of the track groove 7A and the joint center O illustrated in FIG. 2a. That is, FIG. 4 is a sectional view in the plane including an inclined axis N'-N', which is inclined at the angle γ in the circumferential direction with respect to the joint axial line N-N. In FIG. 4, in the track grooves 7A and 7B having different inclination directions from each other, only the track groove 7A is illustrated. In the spherical inner peripheral surface 6 of the outer joint member 2, the track grooves 7A are formed along the axial direction. The track groove 7A has the arc-shaped ball raceway center line X having a curvature center at the joint center O (not offset in the axial direction). When assuming that K represents a perpendicular line at the joint center O, which is perpendicular to the inclined axis N'-N' projected onto the plane M (see FIG. 2a) including the ball raceway center line X of the track groove 7A and the joint center O, the perpendicular line K is located on the joint center plane P at the operating angle of 0°.

Figure 5:
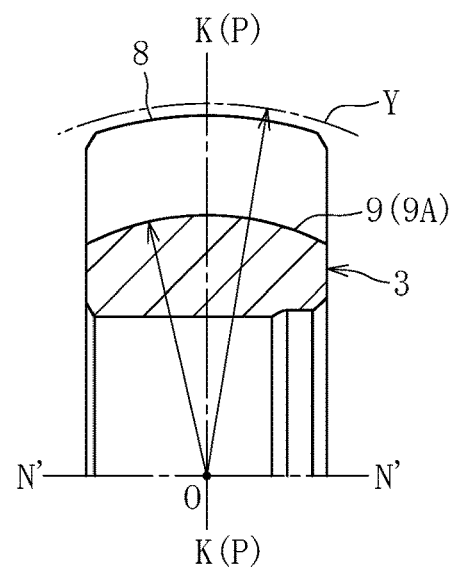
FIG. 5 is a vertical sectional view of details of a track groove of the inner joint member.

Similarly, referring to FIG. 5, detailed description is given of the track grooves of the inner joint member 3. FIG. 5 is a sectional view taken along the plane Q including the ball raceway center line Y of the track groove 9A and the joint center O illustrated in FIG. 3a. That is, FIG. 5 is an illustration of a cross section in the plane including the inclined axis N'-N', which is inclined at the angle γ in the circumferential direction with respect to the joint axial line N-N. In FIG. 5, in the track grooves 9A and 9B having different inclination directions from each other, only the track groove 9A is illustrated. In the spherical outer peripheral surface 8 of the inner joint member 3, the track grooves 9A are formed along the axial direction. The track groove 9A has the arc-shaped ball raceway center line Y having a curvature center at the joint center O (not offset in the axial direction). When assuming that K represents a perpendicular line at the joint center O, which is perpendicular to the inclined axis N'-N' projected onto the plane Q (see FIG. 3a) including the ball raceway center line Y of the track groove 9A and the joint center O, the perpendicular line K is located on the joint center plane P at the operating angle of 0°.

As described above, the track grooves 7 and 9 of the outer joint member 2 and the inner joint member 3 are adjacent to each other in the circumferential direction with their inclination directions opposite to each other, and the paired track grooves 7 and 9 cross each other. Therefore, when both the joint members 2 and 3 rotate relative to each other at the operating angle of 0° illustrated in FIG. 1a, forces in the opposite directions are applied from the balls 4 to pocket portions 5a of the cage 5 that are adjacent to each other in the circumferential direction. Due to the forces in the opposite directions, the cage 5 is stabilized at the position of the joint center O. Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, torque loss and heat generation that may be caused by contact between the spherical surfaces are suppressed effectively. As a result, it is possible to attain a constant velocity universal joint that is excellent in torque transmission efficiency and durability.

Further, in the constant velocity universal joint 1 according to the present invention, the inclination angle γ of each track groove 7 (7A and 7B) of the outer joint member 2 with respect to the joint axial line N-N is set to 8° or more and 16° or less. That is, the plane M including the ball raceway center line X of each track groove 7 (7A and 7B) and the joint center O is inclined within the range of from 8° to 16° in the circumferential direction with respect to the joint axial line N-N. Each track groove 9 of the inner joint member 3 is formed so as to be mirror-image symmetrical with the paired track groove 7 of the outer joint member 2 with respect to the joint center plane P at the operating angle of 0°. Thus, the inclination angle γ of each track groove 9 (9A and 9B) with respect to the joint axial line N-N is also set to 8° or more to 16° or less. That is, the plane Q including the ball raceway center line Y of each track groove 9 (9A and 9B) and the joint center O is inclined within the range of from 8° to 16° in the circumferential direction with respect to the joint axial line N-N.

Figures 6A, 6B:
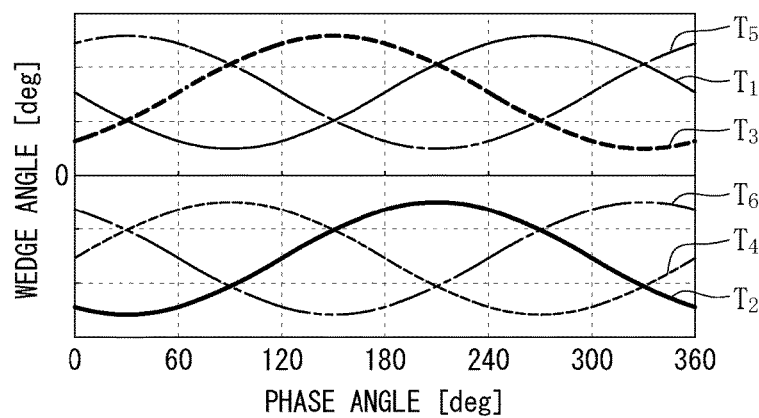
Figure 10A:
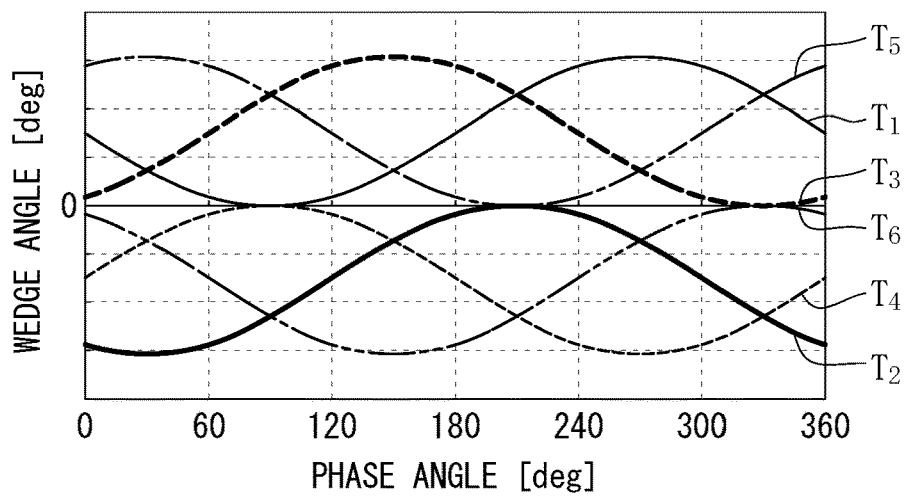
FIG. 10a is an explanatory graph for showing technical findings in the process to arrive at the present invention, specifically, for showing variation patterns of wedge angles of ball tracks along with relative rotation between the outer joint member and the inner joint member under a state in which a six-ball fixed type constant velocity universal joint of a track groove crossing type forms a predetermined operating angle.
Figure 10B:
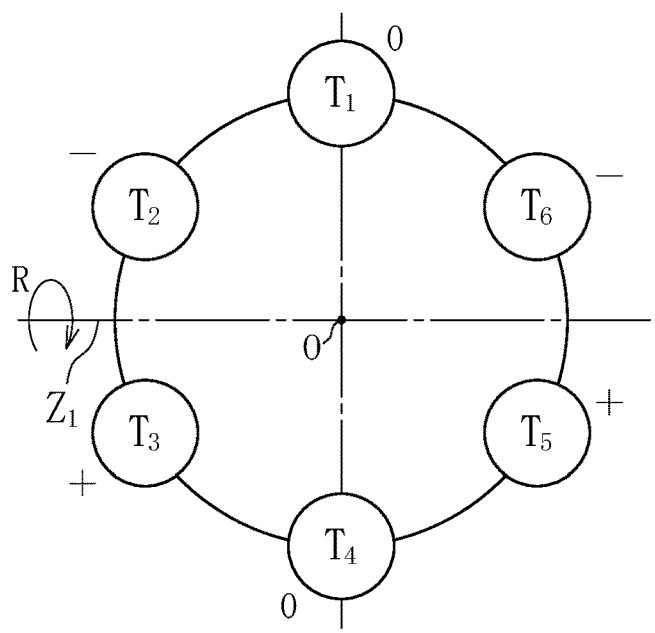
FIG. 10b is a schematic view of a formation pattern of the wedge angles of the ball tracks with respect to a ball track $T_1$ at a phase angle of 90°.
Figure 11A:
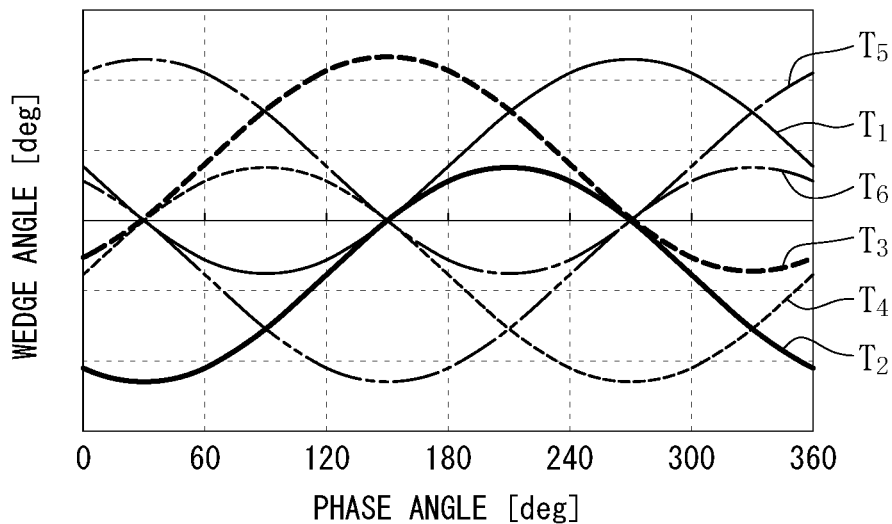
Figure 11B:
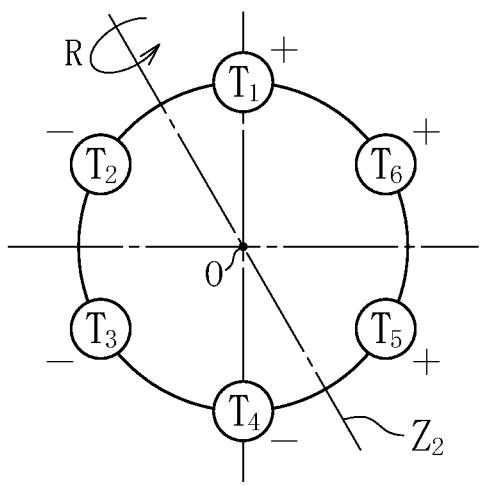
FIG. 11b is a schematic view of a formation pattern of the wedge angles of the ball tracks with respect to the ball track $T_1$ at a phase angle of 0°.
Figure 11C:
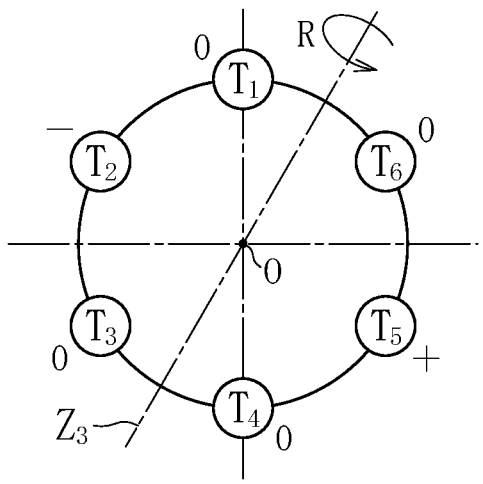
FIG. 11c is a schematic view of a formation pattern of the wedge angles of the ball tracks with respect to the ball track $T_1$ at a phase angle of 45°.
Figure 11D:
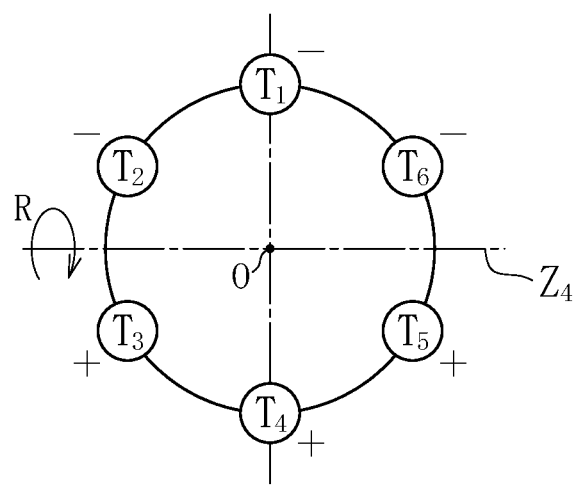
FIG. 11d is a schematic view of a formation pattern of the wedge angles of the ball tracks with respect to the ball track $T_1$ at a phase angle of 90°.
Figure 12:
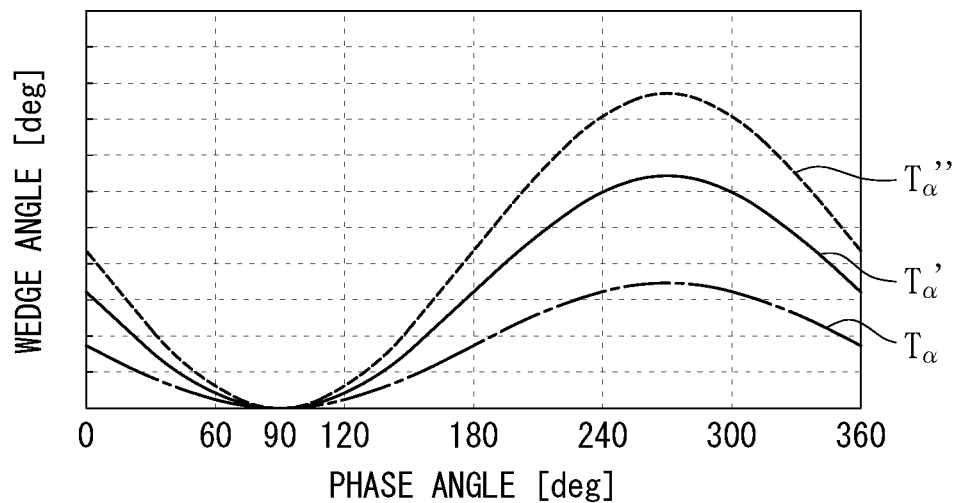
FIG. 12 is an explanatory graph for showing the technical findings in the process to arrive at the present invention.
Figure 13:
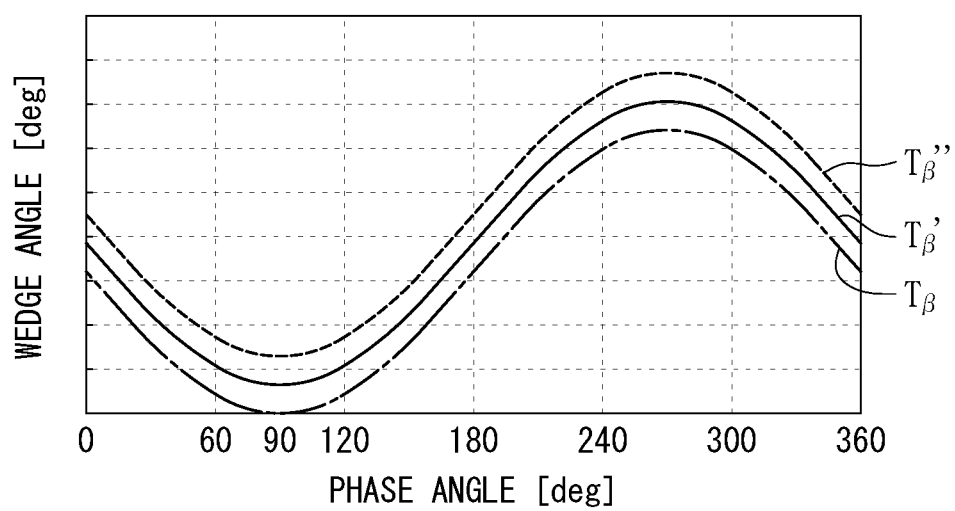
FIG. 13 is an explanatory graph for showing the technical findings in the process to arrive at the present invention.

As described above, when the inclination angle γ of each of the track grooves 7 and 9 is set within the range of from 8° to 16° in the circumferential direction with respect to the joint axial line N-N, as demonstrated by the test results shown in FIG. 6a, also when the outer joint member 2 and the inner joint member 3 rotate relative to each other under a state in which the six-ball constant velocity universal joint 1 of the track groove crossing type described above forms an operating angle, as long as the operating angle described above falls within a range of a normal operating angle (14° or less) of propeller shafts, it is possible to reliably prevent a risk in that opening directions of the wedge angles of the ball tracks formed by the paired track grooves 7 and 9 are reversed to each other. Specifically, in the cases of "o" shown in FIG. 6a, as shown in FIG. 6b, during a single rotation of both the joint members 2 and 3 at the operating angle of 0°, the positive wedge angles do not become zero or negative, and the negative wedge angles do not become zero or positive. With this, it is possible to reliably prevent application of a rotational force to the cage 5, that is, instabilization of behavior of the cage 5 during use of the constant velocity universal joint 1. As a result, it is possible to avoid problems such as increase in torque loss and heat generation that may be caused by the instabilization of the behavior of the cage. Now, supplementary description is given of the marks "Δ" and "x" shown in FIG. 6a. Those marks indicate that the wedge angles vary as exemplified in FIG. 10a and FIG. 11a.

As is clear also from FIG. 6a, theoretically, as the inclination angle γ is set higher, desired joint performance can be stably maintained even when both the joint members 2 and 3 rotate relative to each other at high operating angles. However, as the inclination angle γ is set higher, a spherical width F (see FIG. 3b) between the closest sides of the track grooves 9 of the inner joint member 3 becomes smaller. Therefore, when the inclination angle γ is excessively high (specifically, when inclination angle γ is more than 16°), strength required for the inner joint member 3 is difficult to be secured. For this reason, the inclination angles γ of the track grooves 7 and 9 with respect to the joint axial line N-N is set within a range of from 8° to 16°.

Figure 7:
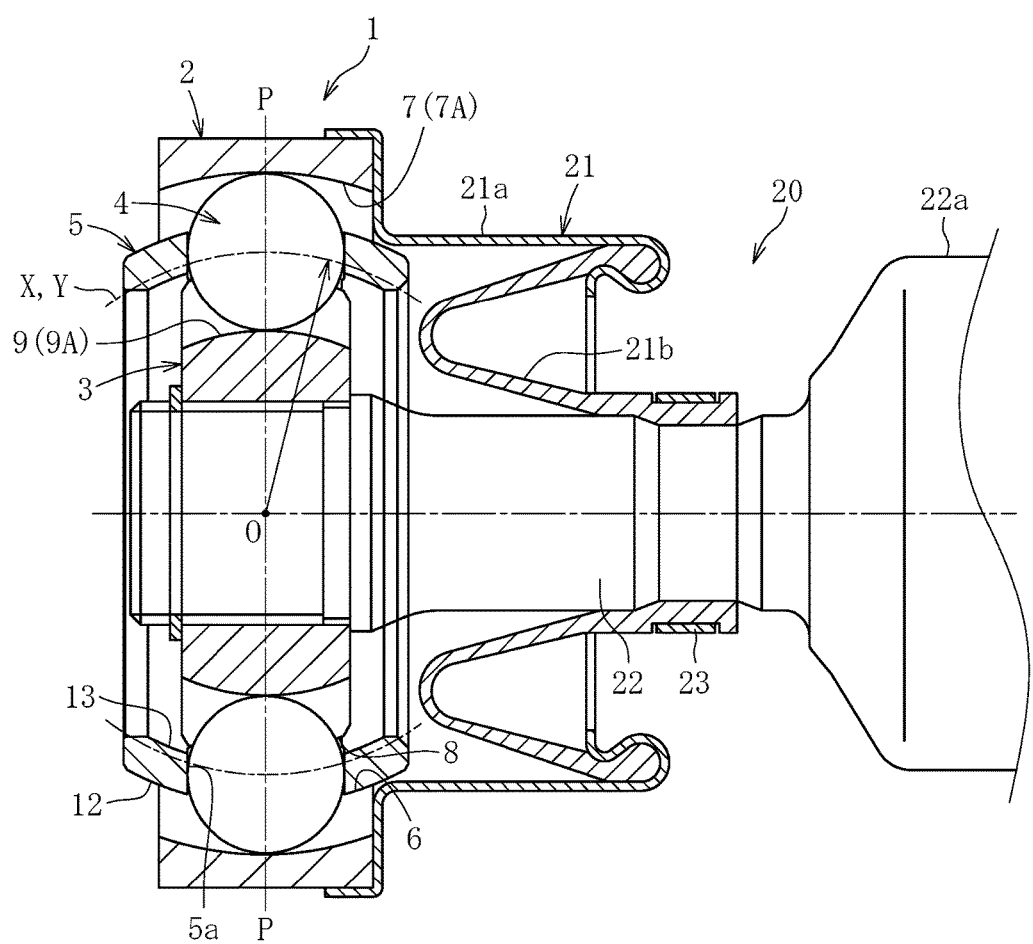
FIG. 7 is a partial sectional view of a propeller shaft comprising the fixed type constant velocity universal joint illustrated in FIG. 1.

FIG. 7 is a schematic sectional view of a propeller shaft comprising the six-ball fixed type constant velocity universal joint 1 of the track groove crossing type described above. The propeller shaft 20 comprises the constant velocity universal joint 1, a shaft 22 comprising one axial end portion that is spline-coupled to a hole portion of the inner joint member 3, and a boot 21 mounted to an outer peripheral surface of the outer joint member 2 and an outer peripheral surface of the shaft 22 so as to prevent the lubricant sealed inside the joint from leaking to an outside. The shaft 22 comprises a large-diameter pipe portion 22a, and a plunging type constant velocity universal joint or a fixed type constant velocity universal joint (not shown) is coupled to the other axial end portion of the shaft 22. The boot 21 comprises a sealing ring 21a fixed to the outer peripheral surface of the outer joint member 2, and an elastic boot portion 21b comprising one end fixed to the sealing ring 21a and the other end mounted to the shaft 22 with a boot band 23. Although detailed illustration is omitted, the sealing ring 21a of the boot 21 is fixed to the outer peripheral surface of the outer joint member 2, for example, by crimping.

Figure 14A:
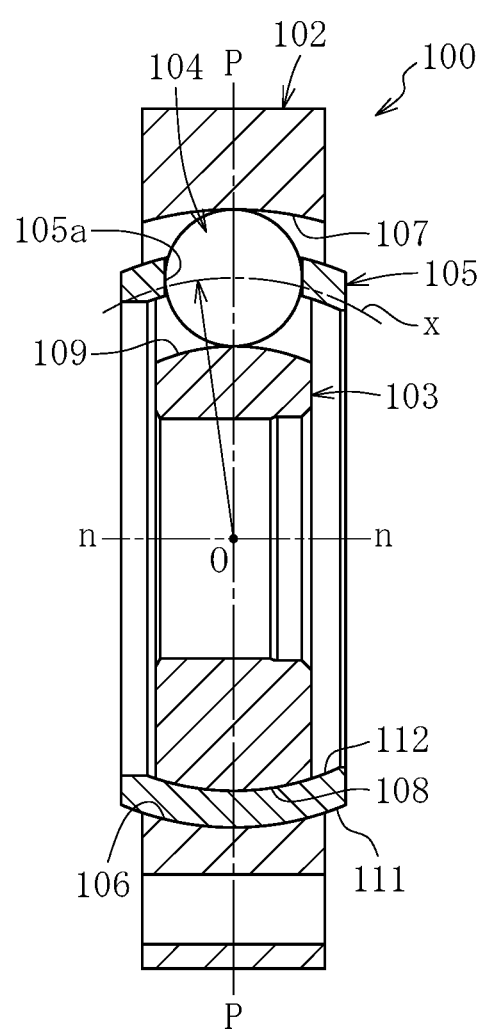
FIG. 14a is a vertical sectional view of an example of an eight-ball fixed type constant velocity universal joint of a track groove crossing type.
Figure 14B:
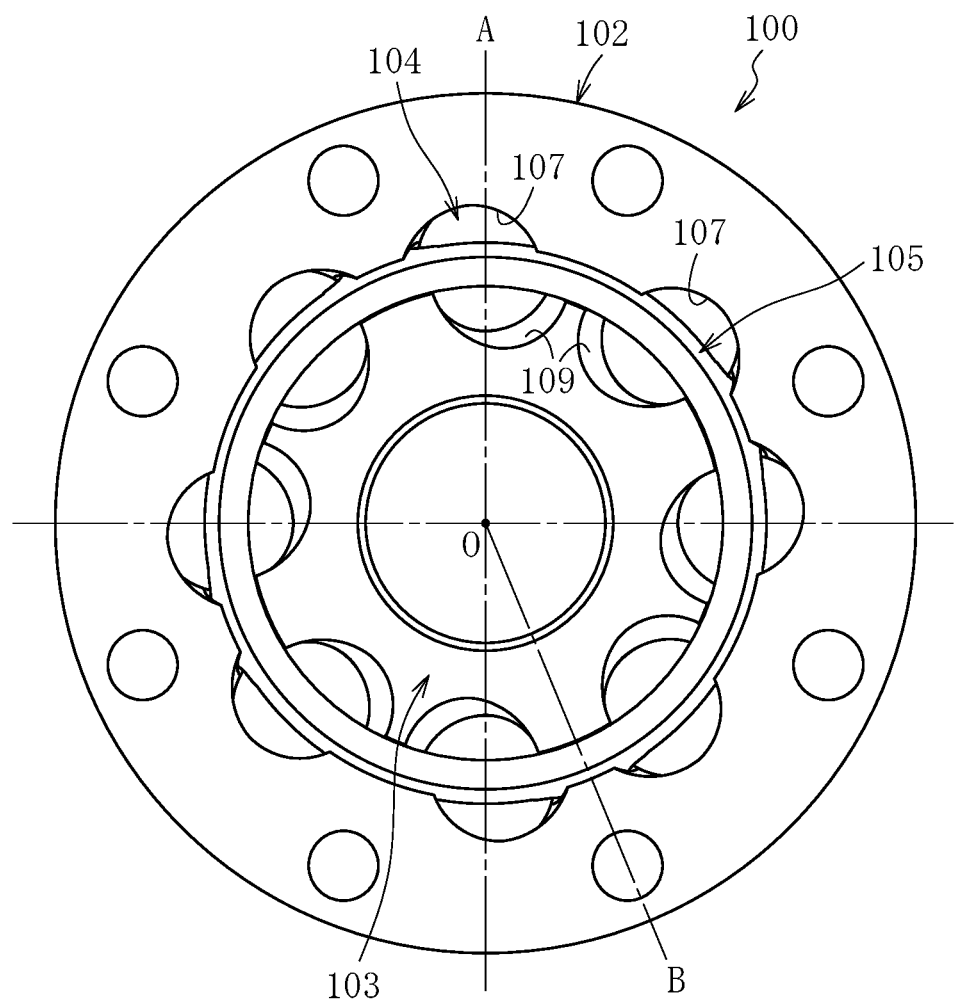
FIG. 14b is a front view of the eight-ball fixed type constant velocity universal joint of the track groove crossing type.
Figure 15A:
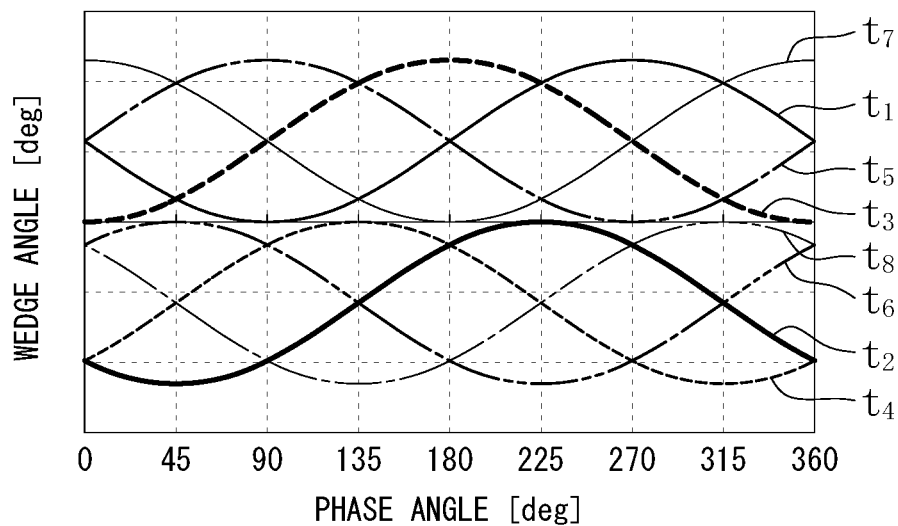
FIG. 15a is a graph for showing variation patterns of wedge angles of ball tracks along with relative rotation between an outer joint member and an inner joint member under a state in which the fixed type constant velocity universal joint illustrated in FIG. 14a forms a predetermined operating angle.
Figure 15B:
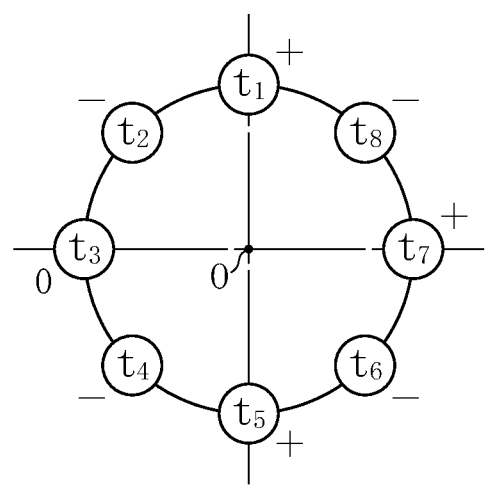
FIG. 15b is a schematic view of a formation pattern of the wedge angles of the ball tracks with respect to a ball track $t_1$ at a phase angle of 0°.
Figure 15C:
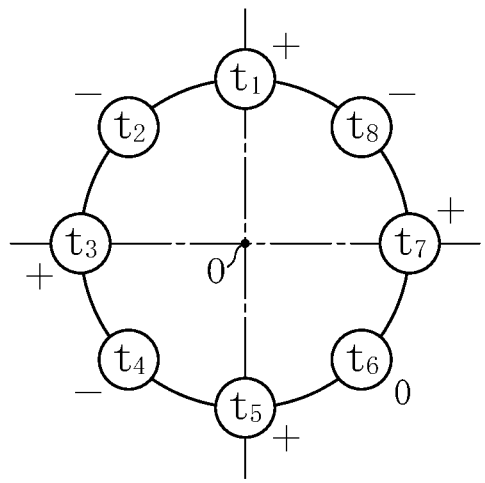
FIG. 15c is a schematic view of a formation pattern of the wedge angles of the ball tracks with respect to the ball track $t_1$ at a phase angle of 45°.
Figure 15D:
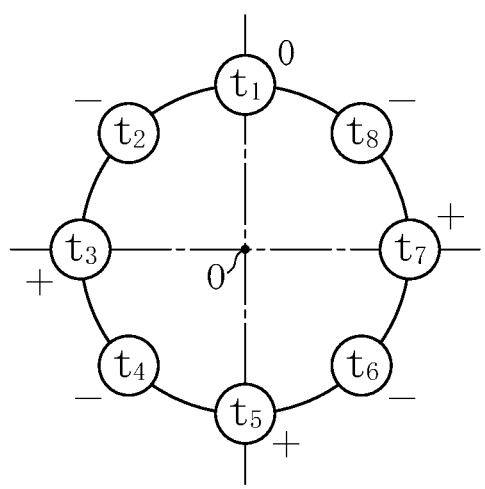
FIG. 15d is a schematic view of a formation pattern of the wedge angles of the ball tracks with respect to the ball track $t_1$ at a phase angle of 90°.

The propeller shaft 20 uses the constant velocity universal joint 1 according to the present invention, and hence the propeller shaft 20 is suppressed in torque loss and heat generation and enhanced in efficiency, and is also lightweight and compact. Further, the six-ball constant velocity universal joint 1 according to the present invention has advantages as follows over the eight-ball constant velocity universal joint 100 illustrated in FIG. 14. (1) Cost reduction can be achieved in accordance with reduction in total number of components. (2) Components are excellent in processability and assemblability, and hence variation in quality (performance) among the constant velocity universal joints can be suppressed. (3) A load capacity can be increased in accordance with increase in ball size. Thus, it is possible to attain the high-quality propeller shaft 20 capable of being inexpensively manufactured and stably maintaining desired torque transmission performance.

The constant velocity universal joint 1 according to the first embodiment of the present invention is described above, but various modifications may be made to the above-mentioned constant velocity universal joint 1 without departing from the spirit of the present invention. Now, constant velocity universal joints according to other embodiments of the present invention are described. The structure different from that of the above-mentioned first embodiment is mainly described below, and the members and parts having substantially similar functions to those of the first embodiment are represented by the same reference symbols to omit redundant description thereof.

Figure 8:
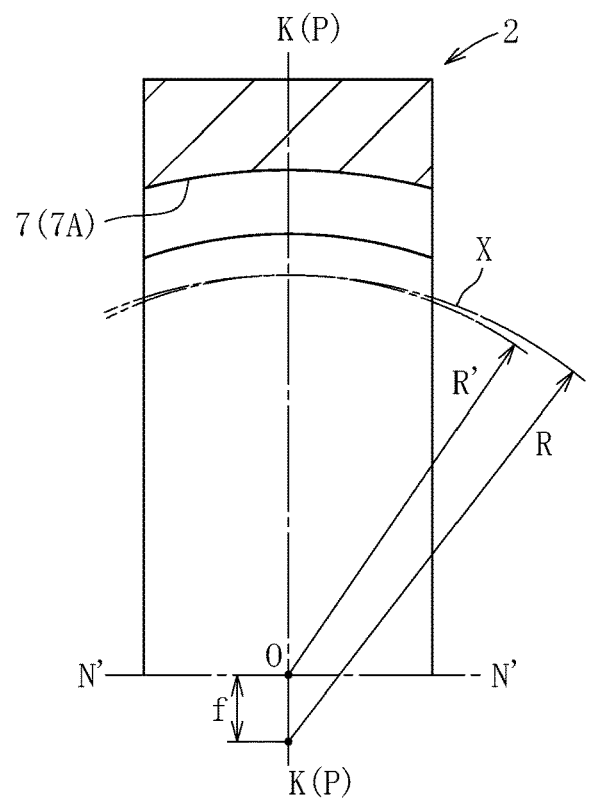
FIG. 8 is a partial vertical sectional view of an outer joint member according to a modification.
Figure 9:
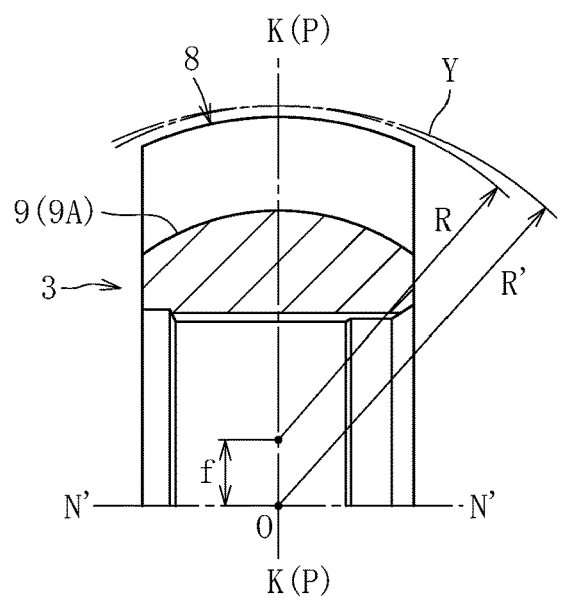
FIG. 9 is a vertical sectional view of an inner joint member according to a modification.

FIG. 8 is a partial sectional view of an outer joint member to be used in a fixed type constant velocity universal joint according to a second embodiment of the present invention. FIG. 9 is a partial sectional view of an inner joint member to be used in a fixed type constant velocity universal joint according to a third embodiment of the present invention. Similarly to FIG. 4, FIG. 8 is a partial sectional view of the outer joint member taken along the plane M (see FIG. 2a) including the ball raceway center line X of the track groove 7A and the joint center O. Similarly to FIG. 5, FIG. 9 is a partial sectional view of the inner joint member taken along the plane Q (see FIG. 3a) including the ball raceway center line Y of the track groove 9A and the joint center O. The constant velocity universal joints according to the second and third embodiments are different from the constant velocity universal joint 1 according to the first embodiment described above mainly in that the curvature center of each of the track grooves (ball raceway center lines) is arranged at a position offset by "f" in a radial direction with respect to the joint axial line N-N (not offset in the axial direction with respect to the joint center O). That is, in the second and third embodiments, the curvature center of the ball raceway center line of each of the track grooves is offset by "f" in the radial direction in the joint center plane P including the perpendicular line K at the operating angle of 0°.

Under the state illustrated in FIG. 8, when the curvature center of the ball raceway center line X of the track groove 7 (7A or 7B) of the outer joint member 2 is offset by "f" in the radial direction with respect to the joint axial line N-N, the groove depth of the track groove 7 (7A or 7B) of the outer joint member 2 can be increased (see reference symbols R and R' in FIG. 8). In this case, the groove depths of the track grooves 9 of the inner joint member 3 assembled to the inner periphery of the outer joint member 2 are decreased. On the other hand, under the state illustrated in FIG. 9, when the curvature center of the ball raceway center line Y of the track groove 9 (9A or 9B) of the inner joint member 3 is offset by "f" in the radial direction with respect to the joint axial line N-N, the groove depth of the track groove 9 (9A or 9B) of the inner joint member 3 can be increased (see reference symbols R and R' in FIG. 9). In this case, the groove depths of the track grooves 7 of the outer joint member 2 having the inner periphery to which the inner joint member 3 is assembled are decreased.

In short, as illustrated in FIG. 8 and FIG. 9, when the curvature center of the ball raceway center line of each of the track grooves is offset in the radial direction with respect to the joint axial line N-N, the depths of the track grooves can be adjusted in accordance with the direction and the amount of the offset.

The above description is directed to the case where the present invention is applied to the fixed type constant velocity universal joint having the track grooves arranged at a regular pitch in the circumferential direction. However, the present invention is also suitably applicable to a fixed type constant velocity universal joint having the track grooves arranged at an irregular pitch in the circumferential direction. Further, in the above-mentioned fixed type constant velocity universal joint, the inclination angles γ of the track grooves with respect to the joint axial line N-N are set equal to each other in all the track grooves, but the present invention is not limited thereto. As long as the inclination angles γ of the paired track grooves of the outer joint member and the inner joint member with respect to the joint axial line N-N are set equal to each other within a range of from 8° to 16°, the inclination angles γ of the track grooves may be set unequal to each other. In short, it is only necessary that the inclination angles be set so that the axial forces of the balls 4 are applied in a balanced manner as a whole to all the pocket portions of the cage 5. Further, in the above description, the present invention is applied to the fixed type constant velocity universal joint in which the balls 4 are held in angular contact with the track grooves 7 and 9. However, the present invention is not limited thereto. The present invention is also suitably applicable to a fixed type constant velocity universal joint configured so that the track grooves 7 and 9 and the balls 4 are held in circular contact by forming the track grooves 7 and 9 into an arc shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents described in the claims and all modifications within the scope of claims.

REFERENCE SIGNS LIST 1 fixed type constant velocity universal joint
2 outer joint member
3 inner joint member
4 ball
5 cage
5a pocket portion
6 spherical inner peripheral surface
7 track groove
8 spherical outer peripheral surface
9 track groove
12 spherical outer peripheral surface
13 spherical inner peripheral surface
20 propeller shaft
K perpendicular line
M plane (plane including ball raceway center line)
N joint axial line O joint center
P joint center plane (joint center plane at operating angle of 0°)
Q plane (plane including ball raceway center line)
X ball raceway center line
Y ball raceway center line
γ inclination angle

The invention claimed is:
1. A fixed type constant velocity universal joint, comprising:
an outer joint member having a spherical inner peripheral surface in which six track grooves are formed so as to extend in an axial direction of the outer joint member;

an inner joint member having a spherical outer peripheral surface in which six track grooves are formed so as to be paired with the six track grooves of the outer joint member;

balls configured to transmit torque,
the balls being interposed between the six track grooves of the outer joint member and the six track grooves of the inner joint member, which are paired with each other; and a cage comprising pocket portions configured to hold the balls,
the cage having:
a spherical outer peripheral surface fitted to the spherical inner peripheral surface of the outer joint member; and
a spherical inner peripheral surface fitted to the spherical outer peripheral surface of the inner joint member, wherein the six track grooves of the outer joint member are each formed into an arc shape having a curvature center that is prevented from being offset in the axial direction with respect to a joint center, wherein the six track grooves of the outer joint member are inclined in a circumferential direction of the outer joint member with respect to a joint axial line and are adjacent to each other in the circumferential direction with their inclination directions opposite to each other, wherein the six track grooves of the inner joint member are formed so as to be mirror-image symmetrical with the six track grooves paired therewith of the outer joint member with respect to a joint center plane at an operating angle of 0°, wherein an inclination angle $\gamma$ of each of the six track grooves of the outer joint member with respect to the joint axial line is set to 8° or more and 16° or less, and wherein at a time when the outer joint member and the inner joint member rotate relative to each other at an operating angle of 14° or less, a rotational force, which is generated by reversing an opening direction of wedge angles of ball tracks formed by the paired track grooves of the outer joint member and the inner joint member, around a straight line extending in a radial direction across a center of the cage is prevented from being applied to the cage.

2. The fixed type constant velocity universal joint according to claim 1, wherein the curvature center of each of the six track grooves of the outer joint member and a curvature center of each of the six track grooves of the inner joint member are arranged on the joint axial line.

3. The fixed type constant velocity universal joint according to claim 1, wherein the curvature center of each of the six track grooves of the outer joint member and a curvature center of each of the six track grooves of the inner joint member are arranged at positions offset in a radial direction of each of the outer joint member and the inner joint member with respect to the joint axial line.

4. The fixed type constant velocity universal joint according to claim 1, wherein the balls are held in contact with the six track grooves of the outer joint member and the six track grooves of the inner joint member at a contact angle of from 30° to 45°.

* * * * *